US008645011B2

(12) United States Patent
Schaffler

(10) Patent No.: US 8,645,011 B2
(45) Date of Patent: Feb. 4, 2014

(54) TRACTION CONTROL SYSTEM AND METHOD

(75) Inventor: Bernard Schaffler, Warriewood (AU)

(73) Assignee: Schaffler IP Pty Limited, Warriewood, New South Wales (AU)

( * ) Notice: Subject to any disclaimer, the term of this patent is extended or adjusted under 35 U.S.C. 154(b) by 0 days.

(21) Appl. No.: 12/867,752

(22) PCT Filed: Feb. 16, 2009

(86) PCT No.: PCT/AU2009/000170
§ 371 (c)(1),
(2), (4) Date: Aug. 29, 2011

(87) PCT Pub. No.: WO2009/100498
PCT Pub. Date: Aug. 20, 2009

(65) Prior Publication Data
US 2012/0116617 A1   May 10, 2012

(30) Foreign Application Priority Data

Feb. 15, 2008   (AU) .................................. 2008900712
Apr. 7, 2008    (AU) .................................. 2008901665
Jan. 23, 2009   (AU) .................................. 2009900263

(51) Int. Cl.
G05D 1/00       (2006.01)
G05D 3/00       (2006.01)
G06F 7/00       (2006.01)
G06F 17/00      (2006.01)

(52) U.S. Cl.
USPC .................................. 701/20; 701/19; 701/22

(58) Field of Classification Search
USPC ............................. 318/85; 702/96; 701/19, 20
See application file for complete search history.

(56) References Cited

U.S. PATENT DOCUMENTS

| 4,757,240 A | 7/1988 | Mizobuchi et al. |
| 4,825,131 A | 4/1989 | Nozaki et al. |
| 5,163,170 A | 11/1992 | Grabowski |
| 5,299,131 A | 3/1994 | Haas et al. |
| 5,473,225 A | 12/1995 | Miyazaki |

(Continued)

FOREIGN PATENT DOCUMENTS

| JP | 06-335106 A | 12/1994 |
| JP | 08-084405 A | 3/1996 |
| JP | 08-182119 A | 7/1996 |
| WO | 94/02335 A1 | 2/1994 |

OTHER PUBLICATIONS

Patent Examination Report No. 1 in Australian Patent Application No. 2009214833, date of issue Jun. 27, 2012.

(Continued)

Primary Examiner — Thomas Black
Assistant Examiner — Robert Payne
(74) Attorney, Agent, or Firm — Nixon Peabody LLP

(57) ABSTRACT

A method for providing traction control on a wheeled vehicle involves receiving a speed reference signal. A variance in wheel size between a first and at least one other wheel of the vehicle is determined. Lastly, a drive control signal operable to control power to each of the first and at least one other wheel is output, the drive control signal being based on the speed reference signal and determined variance in wheel size and operable to provide that a tractive force exerted by each of the wheels on a corresponding surface during traction and/or braking is substantially similar.

25 Claims, 11 Drawing Sheets

(56) References Cited

U.S. PATENT DOCUMENTS

| | | | |
|---|---|---|---|
| 5,492,192 | A | 2/1996 | Brooks et al. |
| 5,706,198 | A | 1/1998 | Schmitt et al. |
| 6,020,714 | A | 2/2000 | Ehrler et al. |
| 6,133,700 | A * | 10/2000 | Kumar ............ 318/85 |
| 6,148,269 | A * | 11/2000 | Kumar et al. ............ 702/96 |
| 6,263,267 | B1 | 7/2001 | Anthony et al. |
| 6,840,587 | B2 | 1/2005 | Eberle et al. |
| 7,283,897 | B2 * | 10/2007 | Kane et al. ............ 701/19 |
| 7,593,795 | B2 * | 9/2009 | Kane et al. ............ 701/19 |
| 8,381,853 | B2 | 2/2013 | Iwaki et al. |
| 8,428,840 | B2 | 4/2013 | O'Dea et al. |
| 8,480,538 | B2 | 7/2013 | Gillingham et al. |
| 2010/0023190 | A1 * | 1/2010 | Kumar et al. ............ 701/20 |
| 2012/0109458 | A1 | 5/2012 | Sidlosky |
| 2012/0277943 | A1 | 11/2012 | Kim |
| 2013/0096797 | A1 | 4/2013 | Whitney et al. |
| 2013/0179015 | A1 | 7/2013 | Liang et al. |

OTHER PUBLICATIONS

International Search Report, PCT/AU2009/000170, dated Apr. 9, 2009.

* cited by examiner

TRACTION CONTROL SYSTEM AND METHOD

CROSS REFERENCE TO RELATED APPLICATIONS OR PRIORITY CLAIM

This application is a national phase of International Application No. PCT/AU2009/000170, entitled, "Traction control System And Method", which was filed on Feb. 16, 2009, and which claims priority of Australian Patent Application No. 2008900712, filed Feb. 15, 2008, Australian Patent Application No. 2008901665, filed Apr. 7, 2008 and Australian Patent Application No. 2009900263, filed Jan. 23, 2009.

FIELD OF THE INVENTION

The present invention relates generally to a traction control system and method and more particularly, but by no means exclusively, to a system and method for providing traction control for a locomotive.

BACKGROUND OF THE INVENTION

In many vehicular applications it is desirable to be able to effectively control the power applied to a drive train, so as to avoid slip and slide of the vehicle's wheels. This is particularly the case for rail based vehicles, such as locomotives, where it is important that the vehicle be able to accelerate up to operating speed in minimal time and to decelerate rapidly to a stop condition.

Locomotives and other rail based vehicles obtain traction and braking forces by means of friction between the wheel surface and the rail surface. Typically, slip and slide occur when the forces applied to the wheels of the locomotive are larger than the maximum friction force between the wheel and rail surfaces. Slip occurs when forward torque is applied to the wheels. Slide occurs when a braking force in the form of reverse torque is applied to the wheels.

In a conventional locomotive, power control is provided by way of a throttle manually set by a locomotive operator. The throttle command is converted into a corresponding electric current supplied to a plurality of electric traction motors whose rotors are drivingly coupled through a pinion gear to axle and wheel sets that are rotary mounted on the vehicle. Under normal operating conditions, the propulsion system is so controlled as to establish a balanced state at each discrete throttle position as set by a driver of the locomotive. In diesel locomotives, an alternator and rectifier bridge supplies a DC current to a plurality of traction inverters providing a controlled alternating current (AC) to a plurality of electric traction motors.

Maximum traction is achieved when each powered wheel of the vehicle is rotating at such an angular velocity that its actual peripheral speed is marginally higher than the actual speed of the vehicle. The difference between the actual velocity of the vehicle and the wheel speed is generally referred to in literature as creep. There is a low margin in the value at which optimum tractive effort is realized, known as optimum creep.

As persons skilled in the art will appreciated, finding the right throttle setting to achieve optimum creep can be difficult to achieve. In many instances the locomotive operator will apply too much throttle resulting in wheel slip and have to subsequently ease off the throttle to maintain fraction. Conversely, during braking, too much braking force can be instructed by the locomotive controller, resulting in wheel slide.

It would be advantageous if there was provided a system which improved the adhesion characteristics of a wheeled vehicle.

SUMMARY OF THE INVENTION

In accordance with a first aspect of the present invention there is provided a traction control system for a wheeled vehicle, the system comprising:
 a receiver arranged to receive a speed reference signal;
 a determination module arranged to determine a variance in wheel size between a first and at least one other wheel of the vehicle based on angular velocity measurements taken for each of the wheels; and
 a control module arranged to utilize the speed reference signal and determined wheel variance to output a drive control signal for powering each of the first and at least one other wheels, the drive control signal operable to provide that a tractive force exerted by each of the wheels on a corresponding surface during traction and/or braking is substantially similar.

In the context of the present specification the term wheel size will be understood as referring to parameters associated with the circumference of the wheel and includes within its scope both wheel diameter and wheel radius.

Embodiments of the present invention relate to traction control systems for wheeled vehicles. Through extensive research and testing, the present inventor has found that wheel wear in vehicles, such as locomotives, can vary from wheel to wheel depending on factors such as wheel location, direction of travel, vehicle loading and the like. It has been found that slip and slide is more likely to occur on wheels that are worn and thus have a smaller diameter/circumference than less worn wheels due to the small margin at which optimum creep is obtained.

The traction control system according to the present invention advantageously compensates for traction and braking force differences exerted on individual wheels of the vehicle caused through wheel wear.

The traction control system may further comprise a communication module for transmitting the drive control signal to individual drive motors coupled to each of the first and at least one other wheel, the individual drive motors operable to apply a rotational force to the respective wheel in accordance with the drive control signal.

The rotational force applied to each of the wheels may be different if the variance in wheel size is above a set threshold.

The traction control system may further comprise an angular velocity measurement module operable to measure the relative angular velocity of each wheel, the relative angular velocity being processed to determine the variance in wheel size.

The relative angular velocity may be determined by comparing actual angular velocities of each wheel against a reference angular velocity.

The actual angular velocity measurements may be taken when the vehicle is traveling at a substantially constant speed.

The vehicle may be a locomotive and a resolver may measure the actual angular velocities of each axle coupled to the first and at least one other wheel.

The reference angular velocity may be an angular velocity of an axle located toward a rear end of the locomotive.

The axle located toward the rear end of the vehicle may be the first or second axle.

The traction control system may further comprise a driver control module operable to generate the speed reference signal based on a user throttle input.

The individual motors may be powered by one or more AC traction inverter circuits.

The traction control system may further comprise a track condition determination module operable to determine a track condition, the track condition also being utilized to generate the drive control signal.

In accordance with a second aspect, the present invention provides a method for providing traction control comprising the steps of:

receiving a speed reference signal;

determining a variance in wheel size between a first and at least one other wheel of the vehicle based on angular velocity measurements taken for each of the wheels; and outputting a drive control signal operable to control power to each of the first and at least one other wheel, the drive control signal being based on the speed reference signal and determined variance in wheel size and operable to provide that a tractive force exerted by each of the wheels on a corresponding surface during traction and/or braking is substantially similar.

The method may comprise the further step of transmitting the drive control signal to individual drive motors coupled to each of the wheels, the individual drive motors operable to apply a rotational force to the respective wheel in accordance with the drive control signal.

The rotational force applied to each wheel may be different if the variance in wheel size is above a set threshold.

The variance in wheel size may be determined by measuring the relative angular velocity of each wheel.

The relative angular velocity may be determined by comparing actual angular velocities of each wheel against a reference angular velocity.

The actual angular velocity measurements may be taken when the vehicle is travelling at a substantially constant speed.

The vehicle may be a locomotive and wherein a resolver measures the actual angular velocities of each axle coupled to the first and at least one other wheel.

The reference angular velocity may be an angular velocity of an axle located toward a rear end of the locomotive.

The method may comprise the further step of determining a track condition, the track condition also being utilized to generate the drive control signal.

In accordance with a fifth aspect, the present invention provides a locomotive employing a traction control system in accordance with the first or third aspect.

In accordance with a third aspect the present invention provides a traction control system for a wheeled vehicle, the system comprising:

a receiver arranged to receive a speed reference signal;

a determination module arranged to determine a variance in wheel size between a first wheel and a reference wheel size; and a control module arranged to utilize the speed reference signal and determined wheel variance to output a drive control signal for powering the first wheel.

The reference wheel size may correspond to the wheel size of at least one other wheel of the vehicle.

The size of the wheel may be associated with any one of a wheel circumference, radius or diameter.

In accordance with a fourth aspect the present invention provides a computer program comprising at least one instruction which, when executed by a computer system, is operable to carry out the method in accordance with the second aspect.

In accordance with a fifth aspect the present invention provides a computer readable medium providing a computer program in accordance with the seventh aspect.

According to a sixth aspect of the present invention, there is provided a control system for dynamic traction control in an electric vehicle such as a locomotive or EMU, comprising;

A torque power generating means for generating AC traction power for at least one electric motor operable to provide tractive force to an associated axle;

first axle angular velocity detecting means for detecting the angular velocity of an axle to which the torque is applied;

second axle angular velocity detection means for detecting the angular velocity of a master axle; and communication means to couple each fraction inverter and angular detecting means to the master control system.

The relative angular velocity of each axle may be measured by a resolve coupled to the axle and applied to calculate the angular velocity difference in axles relative to each other axle or any chosen master axle.

The tractive force may be applied by controlling power to axles to enable motion of the vehicle. The tractive force applied to each axle may be a function of wheel circumference or diameter. Differences in angular velocity in axles rotary connected to the vehicle travelling at a constant speed are relative to variations in wheel circumference/diameter.

In an embodiment, vehicle track adhesion may be obtained by varying the torque applied to axles coupled to wheels having a larger circumference and axles containing wheels with a smaller circumference.

Each traction motor may operate in a free-wheeling mode and at least one driven mode. Each traction inverter in the drive chain is generally coupled with a master controller over a communication network. Each traction inverter in the drive chain may be directly coupled with the master controller.

The angular velocity detection module may be coupled with the master controller over a communication network. The angular velocity detection module may be directly coupled with a master controller.

In one embodiment the control system measures the angular velocity of each axle when the locomotive or EMU is coasting and at a pre-determined time interval. A master reference angular velocity signal is derived from the average of all angular velocities minus the maximum and minimum values.

A compensating torque coefficient may be calculated for each axle. The respective torque compensation coefficient may be applied to each traction inverter.

In one embodiment each traction motor is driven by a separate dedicated AC inverter circuit. This provides improved track adhesion because each traction motor will deliver the correct force for the track condition and wheel circumference.

In an embodiment each axle assembly consists of an axle, two wheels, an AC electric traction motor mounted with a direct coupled resolver to provide feedback to the Master Controller and a traction inverter coupled to the Master Controller. The vehicle typically includes a plurality of such axle assemblies, one to each axle, as well as a primary energy source, a means for controlling the primary energy source and energy conversion means such as an alternator.

In an embodiment, a master control circuit receives input from a plurality of resolver devices to determine the angular velocity of each axle. Angular velocity is directly related to the circumference of wheels that are mounted on each axle. The master control circuit compares the angular velocity of each axle and adjusts the traction inverter output on the axle assembly to compensate for wheel wear, resulting in the same torque at the wheel to rail surface for all wheels on the vehicle.

In yet another aspect of the present invention, there is provided a method of using a control system for dynamic fraction control in an electric vehicle, such as a locomotive or EMU (such as described above), said method including taking angular velocity measure measurements and conducting traction force calculations. Such measurements and calculations may be affected automatically (e.g. by an appropriate computer program). The measurements and calculations may be implemented by a digital signal processor operating within the Master Control system.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION

The present invention relates to traction control systems and methods which advantageously compensate for different traction and braking forces experienced by individual wheels of a vehicle having varying sizes. In an embodiment, this is achieved by measuring the individual wheel diameters relative to a reference wheel diameter and taking those measurements into account when controlling power to each individual wheel, so as to avoid wheel slip and slide.

Embodiments of the present invention will hereafter be described in the context of a traction control system and method for an AC locomotive. However, it will be understood by persons skilled in the art that embodiments are equally applicable to any wheeled vehicle and should not be seen as limited to the particular embodiment described herein. For example, the present invention could equally be used for controlling traction on a grader, or any other vehicle where varying wheel diameter may cause slip and slide to occur.

Figure 1A:
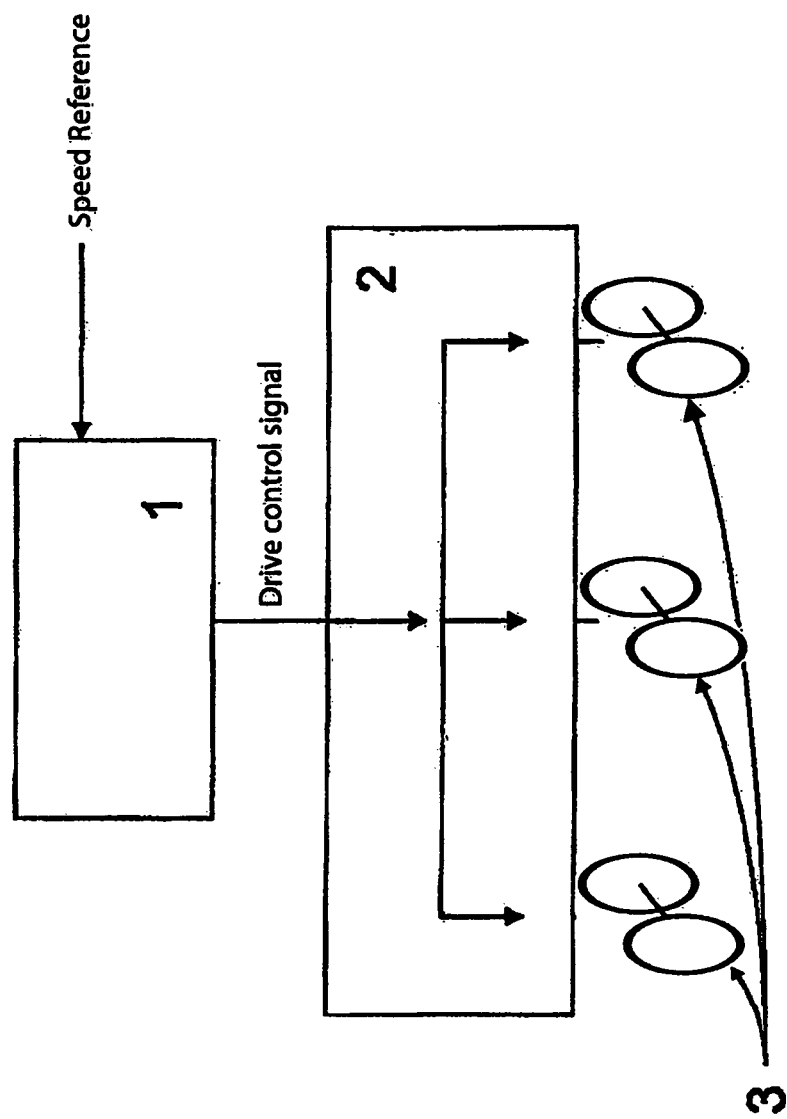
FIG. 1a is a schematic of a system in accordance with an embodiment of the present invention.

With reference to FIG. 1A, there is shown a traction control system 1 in accordance with an embodiment. The traction control system is coupled to an AC locomotive 2 having a plurality of axles 3. The traction controller system 1 is operable to receive a speed reference signal in the form of a throttle command instructed by a locomotive operator. A variance in wheel diameter between a first and at least one other wheel of the locomotive 2 is then determined from angular velocity measurements taken for each wheel. Finally, a drive control signal operable to control the power output by individual AC traction inverters 3a coupled to each wheel axle 3 is then generated and communicated to the respective inverters. The drive control signal is based on the speed reference signal and determined variance in wheel diameter and is operable to provide that a tractive force exerted by each of the wheels on a corresponding surface during traction and/or braking is substantially similar.

Detail of the AC Locomotive

Figure 1B:
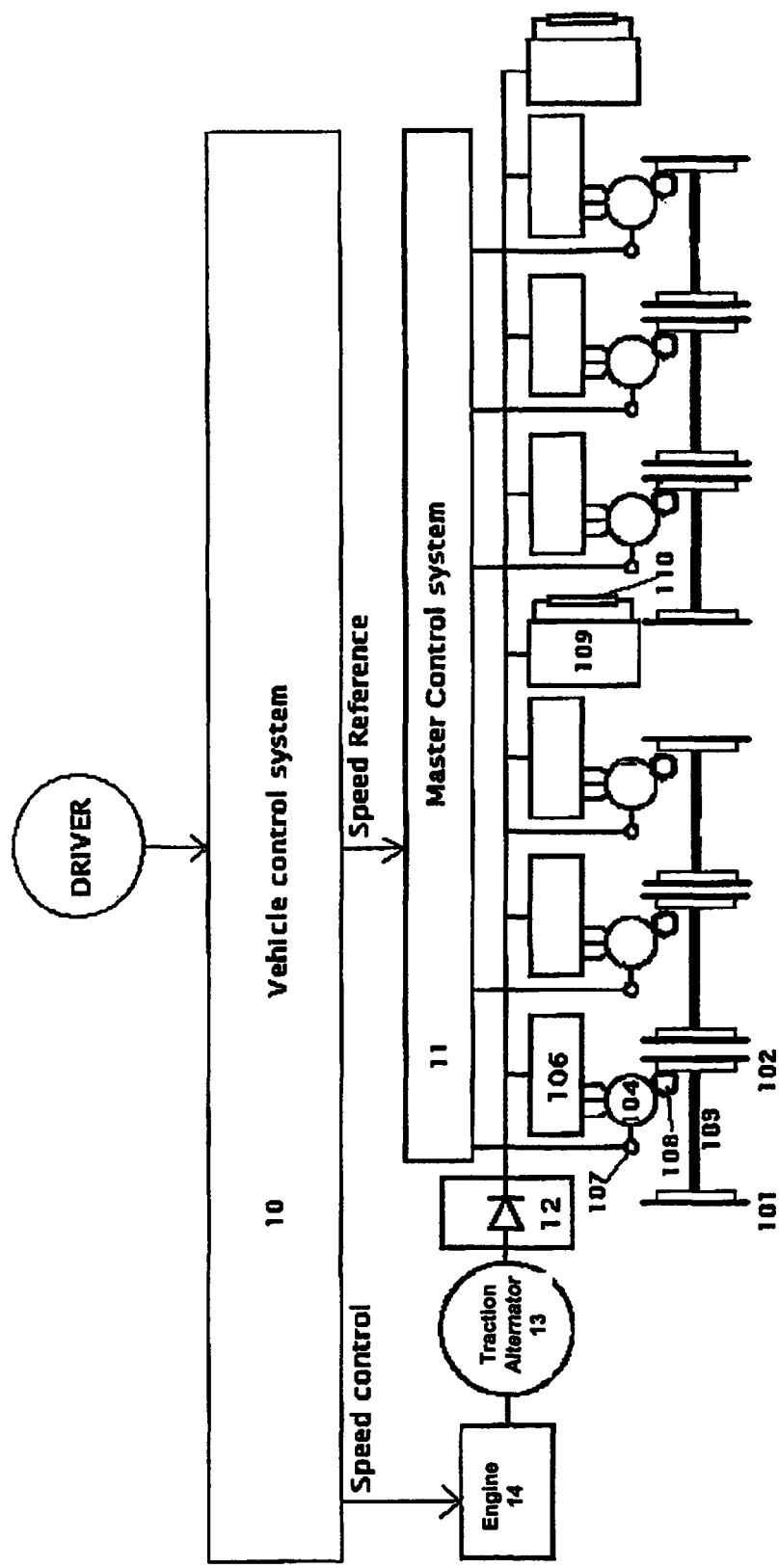
FIG. 1b is a simplified block diagram showing a system in accordance with an embodiment of the present invention.

In more detail, and with reference to FIG. 1B, the AC locomotive 102 is powered by a primary power source 14 labeled "engine". An energy conversion means 13 labeled "Traction Alternator" and a conventional uncontrolled three-phase power rectifier bridge 12 are coupled to the engine 14. The illustrated embodiment takes a speed reference input from a conventional vehicle control system (VCS) controlled by the driver and outputs a drive control signal for controlling power output by the engine 14. The power rectifier bridge 12 is electrically coupled via a DC bus 15 to a plurality of fraction inverters 106 (only one of which is shown for simplicity). According to the presently described embodiment, the traction inverters 106 are in the form of three-phase Alternating Current (AC) Pulse Width Modulated (PWM) inverters having a plurality of pairs of Insulated Gate Bipolar Transistors (IGBT transistors).

Each of the pairs of transistors is sequenced to provide an AC traction current to traction motor 104. The traction force is controlled by varying the time that each transistor is gated in the conductivity state. Each traction inverter 106 generates a three phase power signal for a traction motor 104. The traction motor 104 is drivingly coupled to an axle 103 through pinion 108. Wheels 101 and 102 are connected to axle 103.

An angular velocity measurement module in the form of a resolver 107 is coupled to the axle 103 through traction motor 104 and pinion 108. The resolver 107 generates a sequence of pulses which are directly proportional to the circumference of wheels 101 and 102 (which are in contact with the rails 105) and outputs an angular velocity measurement signal which is indicative of the angular velocity of the wheels.

The angular velocity measurement signals output by the respective resolvers are input to a traction controller 11 in the form of a Master Control system (hereafter "MCS") and processed to determine a diameter compensation co-efficient for individual axles of the locomotive 102, as will be described in more detail in subsequent paragraphs. In one embodiment, the MCS 11 comprises an Application Specific Integrated Circuit (ASIC) and a Digital Signal Processor (DSP) for making the necessary traction control decisions, as will be described later with reference to FIG. 5.

Traction and Braking Operations

Figure 2A:
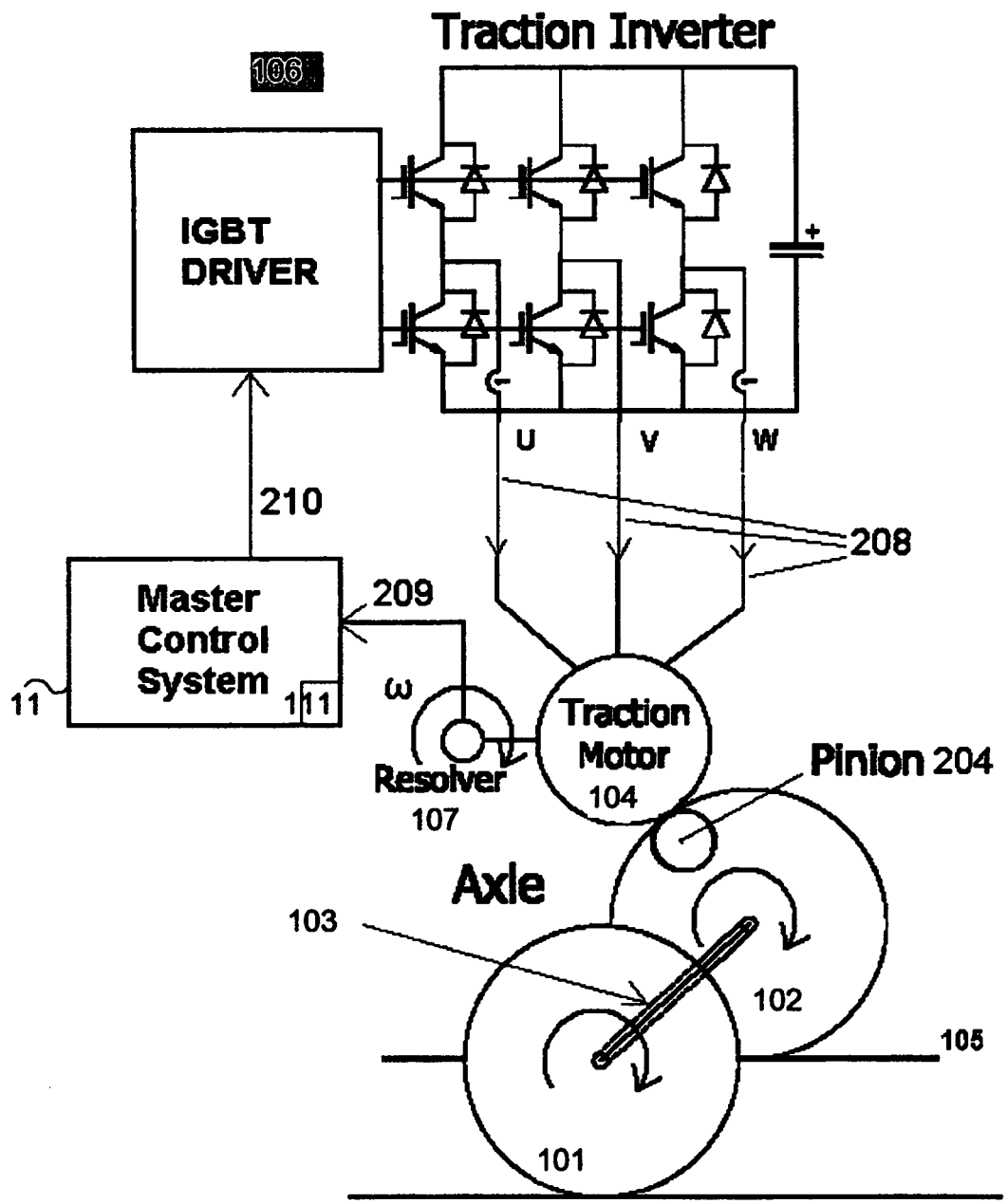
FIG. 2a is a simplified block diagram that shows one set of wheels on a locomotive or EMU with traction inverters, traction motors and resolver feedback to a master controller, in accordance with an embodiment.

FIG. 2a is a simplified block diagram that shows one embodiment of an axle assembly in traction, or "drive" mode. In the illustrated embodiment, each axle assembly consists of an axle 103 to which wheels 101 and 102 are attached, a traction motor 104 having a rotor and output shaft applying torque to wheels 101 and 102 through pinion 204, a traction inverter 106 generating an AC traction drive power signal 208 and a resolver 107 that provides the angular velocity measurement signal 209 to the MCS 11. The MCS 11 implements a determination module 111 arranged to determine, based on the measurement signals output from each resolver 107, angular velocities for each axle wheel set and processes the measurements to generate suitable torque/drive control signals for applying to each traction inverter 106.

Figure 2B:
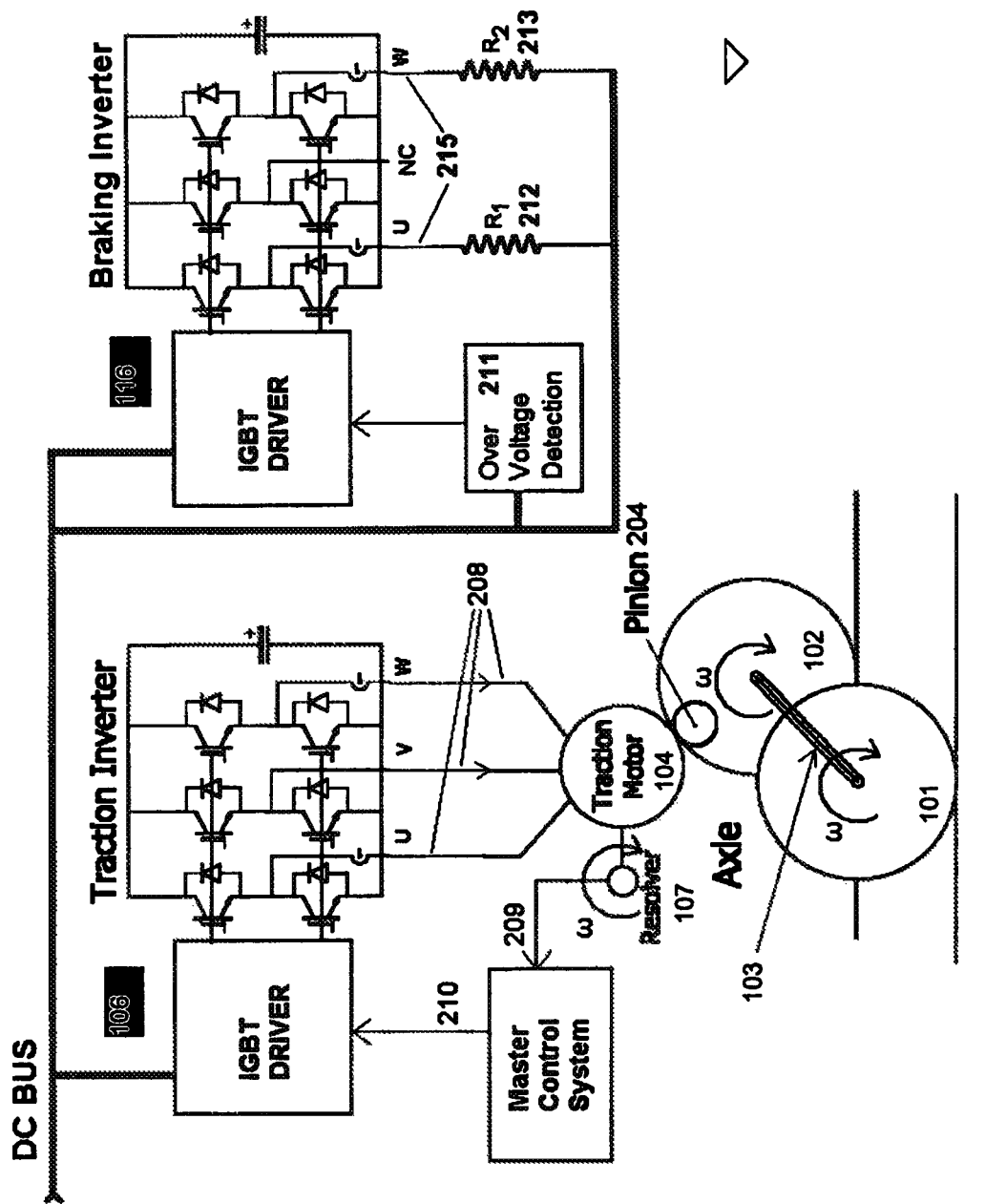
FIG. 2b is a simplified block diagram that shows one set of wheels on a locomotive or EMU with traction inverters, traction motors and resolver feedback, and one braking inverter with over-voltage detection means, in accordance with an embodiment.

FIG. 2B shows a simplified block diagram that shows one embodiment of an axle assembly in braking mode. The braking inverter 116 is shown in addition to the fraction inverter 106. When the vehicle is braking, the fraction motor 104 has a greater angular velocity than driven by the traction inverter 106. The induction coil of the motor 104 generates a 3-phase power signal 208 that is returned to the traction inverter 106. The diodes that are placed across each IGBT from emitter to collector rectify the incoming three phase AC current. This causes the DC Bus voltage level to increase. The over-voltage detection circuit 211 is triggered causing the braking inverter 116 to draw AC current through resisters 212 and 213, causing the DC voltage level to be normalized. Alternatively, the power can be regenerated back to the power source 14A if the power source is from an overhead catenary source.

Detail of Traction Inverters

Figure 4:
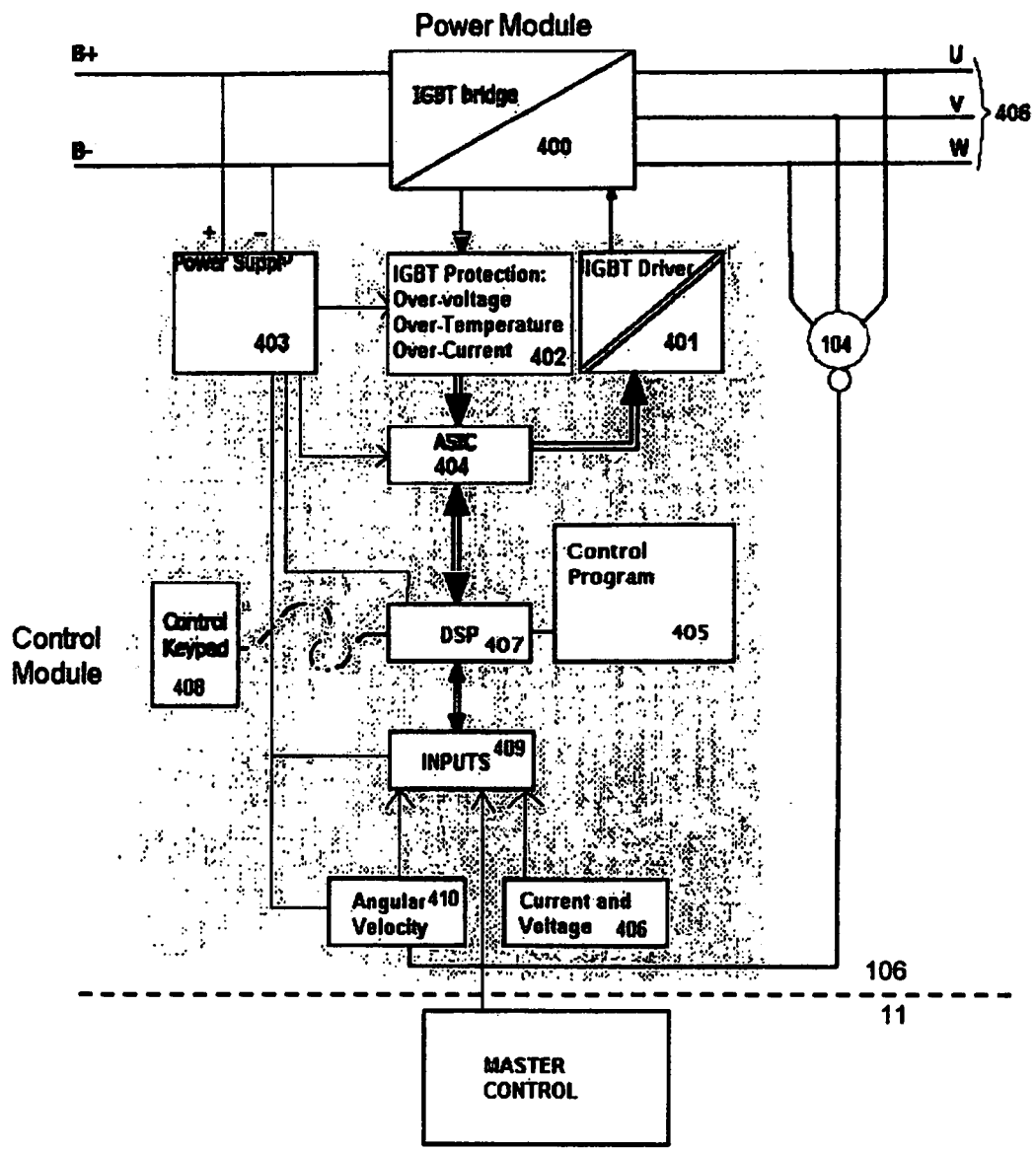
FIG. 4 is a simplified block diagram of each traction inverter, showing the Power Unit and the Controller Unit.

FIG. 4 shows a detailed block diagram of a single traction inverter 106. According to the illustrated embodiment, the traction inverter 106 drives one IGBT bridge existing out of six IGBT devices and receives input from one resolver 107. The traction inverter 106 consists of two primary modules, namely: a power module which drives the IGBT inverter modules; and an application control module.

The power module consists of a plurality of IGBT bridge circuits 400, a DC power supply 403, an ASIC (Application Specific Integrated Circuit) 404 and IGBT driver circuitry 401. The IGBT circuitry 401 is controlled by the application control module, as discussed below.

The application control module comprises a Digital Signal Processor (DSP) 407, inverter control program 405, input conditioning circuits 409, and detachable parameter input control pad 408. The application control module receives angular velocity measurement signals from the associated resolver 107, as previously described. A detachable keypad 408 is used to enter specific power source and vehicle parameters. Motor current and voltage are measured and used to calculate motor torque. The application control module functions, inter alia, to protect the power module from overload, over-temperature, over-voltage and over-current.

The inverter control program 405 is executed by the DSP 407 of the application module. The control program 405 is stored in electrically erasable flash memory. The DSP 407 is programmed to provide the correct switching times and protection for the IGBT bridge through Application Specific Integrated Circuit 404 and driver circuits 401. Power supply 403 receives a DC input voltage from the DC bus and creates from this supply all other voltages for the DSP, memory and control circuits.

Master Controller System

Referring back to FIG. 3, there is shown a specific implementation of the system, whereby six traction inverters 106 and traction motors (numbered 104a through to 104f) are connected to a single MCS 11. The MCS 11 comprises a microprocessor and is arranged to execute a traction control program code stored in memory. Input to the MCS 11 are (a) angular velocity measurement signals generated by six resolver devices 107 representative of the angular velocity of each axle; and (b) a speed reference signal from the VCS 10.

Figure 3:
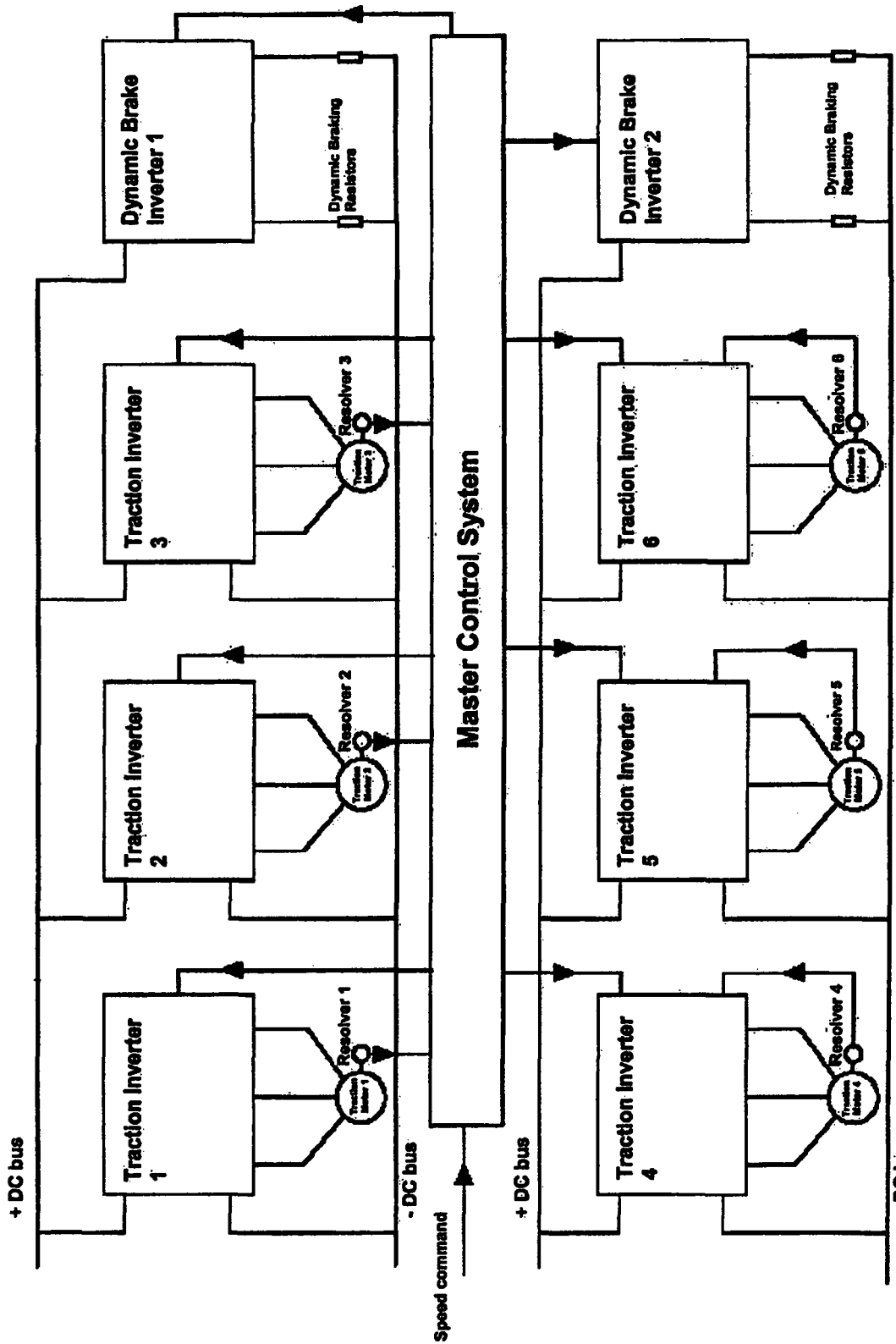
FIG. 3 is a simplified diagram showing a typical embodiment of six traction inverters driving six traction motors controlled from the Master Control system and two braking inverters.

According to the FIG. 3 embodiment, the MCS 11 also takes into consideration the track condition when determining the compensating torque coefficient utilized in the drive control signal.

As previously mentioned, the MCS 11 is operable to receive both a drive control signal from a train operator and angular velocity measurement signals from the resolvers 107. The MCS is further operable to output compensated torque control signals to each of the traction inverters 106 if it is determined that there is sufficient variance in wheel diameter between different axle wheel sets. Before describing the calculations used to generate compensated torque control signals, a brief description of the principles of adhesion control will first be described.

The motion equations of the locomotive are governed by equations (1) and (2) below.

$$M\frac{d}{dt}\omega_d = \mu(v_s)Wg - F_d(v_t) \qquad (1)$$

$$J\frac{d}{dt}\omega_d = \tau - \mu(v_s)Wgr \qquad (2)$$

$$v_s = v_d - v_t$$

Figure 3A:
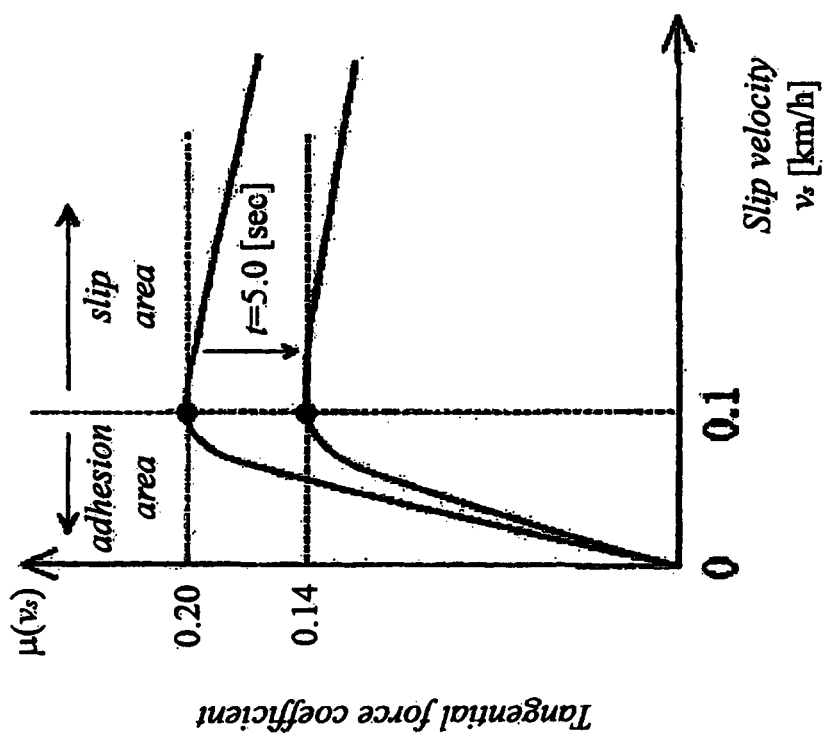
FIG. 3A is a graph showing characteristics between tangential force coefficient and slip velocity.

Where
$V_t$=velocity of locomotive
$V_d$=velocity of wheel
$\omega_d$=angular velocity of the wheel
W=weight of locomotive
M=weight on wheel
J=total inertia moment of wheel
$F_d(v_t)$=resistance of locomotive
g=gravity acceleration
t=torque delivered by traction motor In equation (2), $\mu(v_s)Wgr$ is the wheel torque corresponding to the tangential force between the rail and driving wheel. The tangential force $\mu$ is a function of slip velocity $v_s$ as shown in FIG. 3A. The peak value of tangential velocity (Numerical simulation condition) force is determined by the condition of maximum tangential force coefficient $\mu(v_s)$. When the adhesion force becomes its peak value, the adhesion force coefficient also becomes its peak value. Therefore, when $du/dvs=0$ is realized, the driving torque t corresponds to the maximum adhesion force. The purpose of the adhesion control system, as seen below, is to search the maximum point of the adhesion which corresponds to $du/dvs=0$. In practice, du/dt may be used to assess whether du/ds is zero, which can be implemented by calculating the force on wheel based on the torque delivered by traction motor and the movement equation of locomotive within a certain time period, such that the desired anti-slip re-adhesion control should keep the driving torque $\tau$ near to the maximum tangential force.

The equations used by the MCS 11 to determine the necessary torque to apply for equal force distribution are shown below (for three or more axles):

1. Angular speed feedback:

$$n_1, n_2, n_3 \ldots n_N \qquad (3)$$

2. Actual speed:

$$n_a = \frac{(n_1 + n_2 + n_3 \ldots n_N) - \max(n_1, n_2, n_3 \ldots n_N) - \min(n_1, n_2, n_3 \ldots n_N)}{N - 2} \qquad (4)$$

3. Calculate compensation coefficient for axle 1

$$K_{C_1} = 1 + \frac{n_a - n_1}{n_a} \quad (5)$$

4. Diameter correction for axle 1

$$D_1 = \frac{D_n}{K_{C_1}} \quad (6)$$

5. Torque calculation for axle 1:

$$T_1 = \frac{3n_p}{\gamma_2} \varphi_2^2 (\omega_2 - \omega_1) \quad (7)$$

$$T_1 = F_1 \cdot \frac{D_1}{2} \quad (8)$$

$$\therefore F_1 \cdot \frac{D_1}{2} = \frac{3n_p}{\gamma_2} \varphi_2^2 (\omega_2 - \omega_1) \quad (9)$$

$$\therefore F_1 = \frac{6n_p \cdot \varphi_2^2 (\omega_2 - \omega_1)}{D_1 \cdot \gamma_2} \quad (10)$$

because $D_1 = D_n / K_{C_1}$ $$\therefore F_1 = \frac{6n_p \cdot \varphi_2^2 (\omega_2 - \omega_1) \cdot K_{C_1}}{D_n \cdot \gamma_2} \quad (11)$$

where:
$n_1 \ldots n_N$—Angular speed feedback (N≥3)
$n_a$—Actual angular speed
$K_{C_1} \ldots K_{C_N}$—compensation coefficient
$D_n$—nominal wheel diameter
$D_L \ldots D_N$—wheel diameter after correction
$n_p$—Traction motor poles
$\gamma_2$—rotor resistance
$\phi_2$—rotor excitation field
$\omega_2$—rotor angular speed
$\omega_1$—stator angular speed As can be seen from the above equations, for axles where the motor characteristics are consistent, the force applied is reliant upon the diameter of each wheel. In other words, using the above equations, it is possible in one embodiment to set the torque applied to each inverter such that the applied force is distributed so as to provide that the tractive force exerted by each wheel on the rail during fraction or braking is substantially the same.

In the presently described embodiment, $D_1$ is set to be the reference wheel and the force calculations repeated for other axle sets, with reference to $D_1$. The reference wheel may, for example, be a trailing wheel of the carriage based on the assumption that the trailing wheel will always wear the least due to load and motion characteristics of the locomotive.

In an embodiment, track condition is also be utilized in the torque control loop (i.e. to determine force F1) and calculated in accordance with techniques known to persons skilled in the art.

Figure 5:
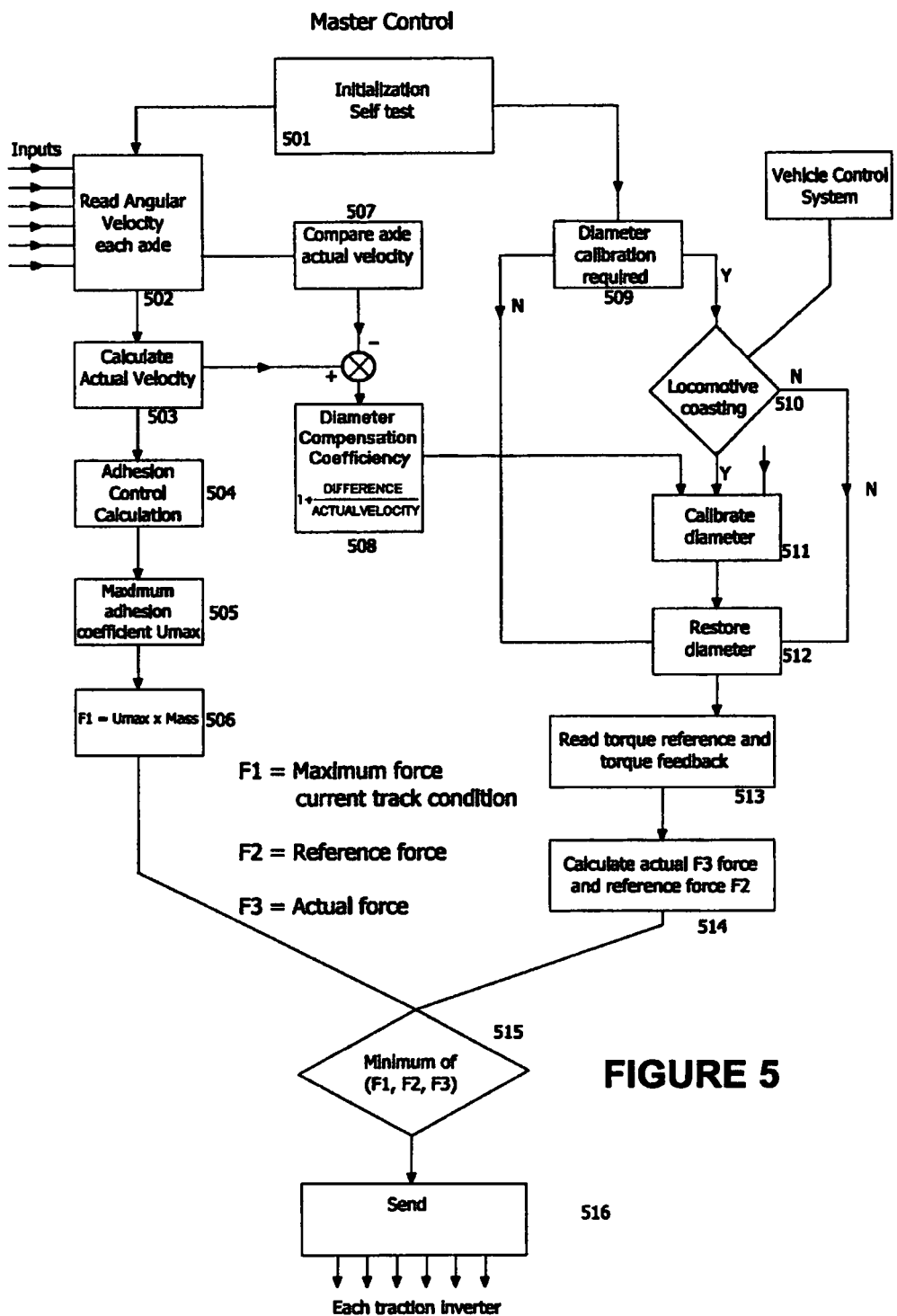
FIG. 5 is a flow chart for a program implemented by a Master Control System in accordance with an embodiment.

Operation of the fraction control program code executed by the MCS 11 will hereafter be described with reference to FIG. 5.

Procedure 501 implemented by the traction control program code involves carrying out an initialization and diagnostic test. Procedure 502 monitors and receives angular velocity measurement signals from the resolvers 107 and calculates the individual angular velocities of each axle.

Procedure 503 utilizes the angular velocities to determine an actual vehicle velocity as a reference velocity (as per equations 3 and 4 above). Procedures 504 through 506 then process the angular velocities to determine a maximum force for a current track condition F1. According to the illustrated embodiment, the maximum force F1 is obtained where the adhesion force co-efficient is at its maximum (as described above) and derived from both $U_{Max}$ and the mass of the locomotive. The reference force, F2 is derived from the drive control signal issued by the locomotive operator (i.e. based on the assumption that all wheels are of equal diameter).

At procedure 507 and 508, a diameter compensation coefficient is determined utilizing equations 5 and 6. In the illustrated embodiment, the diameters of each wheel set (relative to a reference wheel set, such as the trailing wheel set) are constantly determined while the locomotive is coasting, for accuracy (procedure 510). In an embodiment, procedure 510 determines whether the locomotive is coasting by taking input from the conventional vehicle control system. Procedure 509 determines whether wheel diameter calibration is required. In an embodiment, this is achieved by determining whether the variance in wheel diameter between a current wheel set and a reference wheel set (e.g. the trailing wheel set) is above a particular threshold. If the vehicle is coasting and wheel diameter calibration is deemed necessary by parameter 509, the wheel diameter parameters 512 are updated and stored in memory.

Procedure 513 takes input from the vehicle Control System, wheel diameter from procedure 512 and feedback parameters from the corresponding traction inverters 106 and returns a current torque parameter compensated for wheel diameter. The corresponding Force F3 is subsequently determined (as per equations 6 through 11). At procedure 515, the controller determines which of the three forces F1, F2 and F3 is the smallest. The control mode which delivered the lowest force reading is used for controlling power to the individual traction inverters. Procedure 516 then conditions the output parameters and generates a drive control signal which is sent to the traction inverters 106 for affecting movement of the locomotive.

In an embodiment, the control program 500 is located in program memory and executed by the DSP within the Master Control system.

Figure 6:
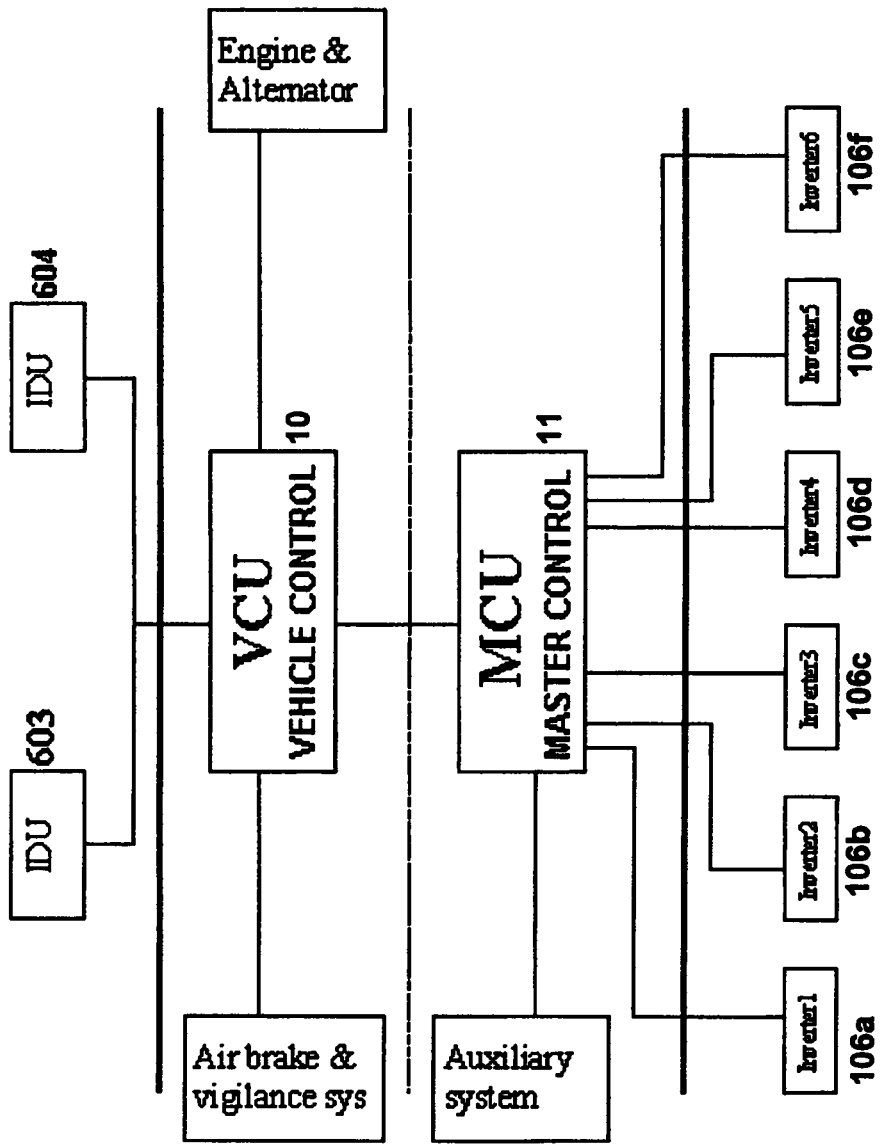
FIG. 6 is a simplified block diagram of a vehicle system showing the relationship between a vehicle control unit (VCU) and master control unit (MCU), in accordance with an embodiment.

FIG. 6 is a block diagram of the control system according to a further embodiment, comprising the Master Control system (MCU) 11 connected to six traction inverter circuits 106 (see FIG. 4 for more detail of the individual circuits) and a conventional Vehicle Control system (VCU) 10. Display Units 603 and 604 display technical information about the system.

Figure 1C:
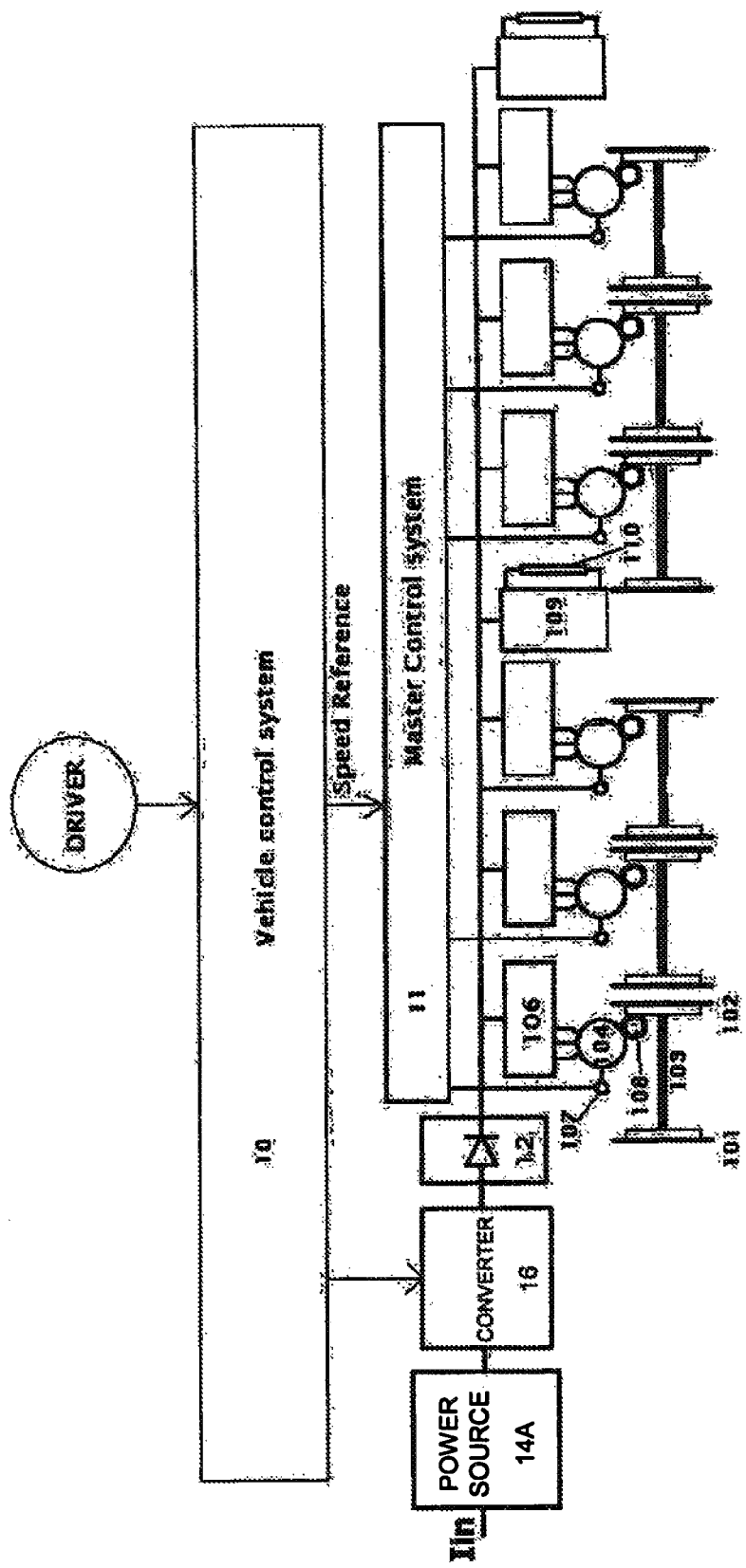
FIG. 1c is a simplified block diagram showing a system in accordance with an alternative embodiment of the present invention.
Figure 1D:
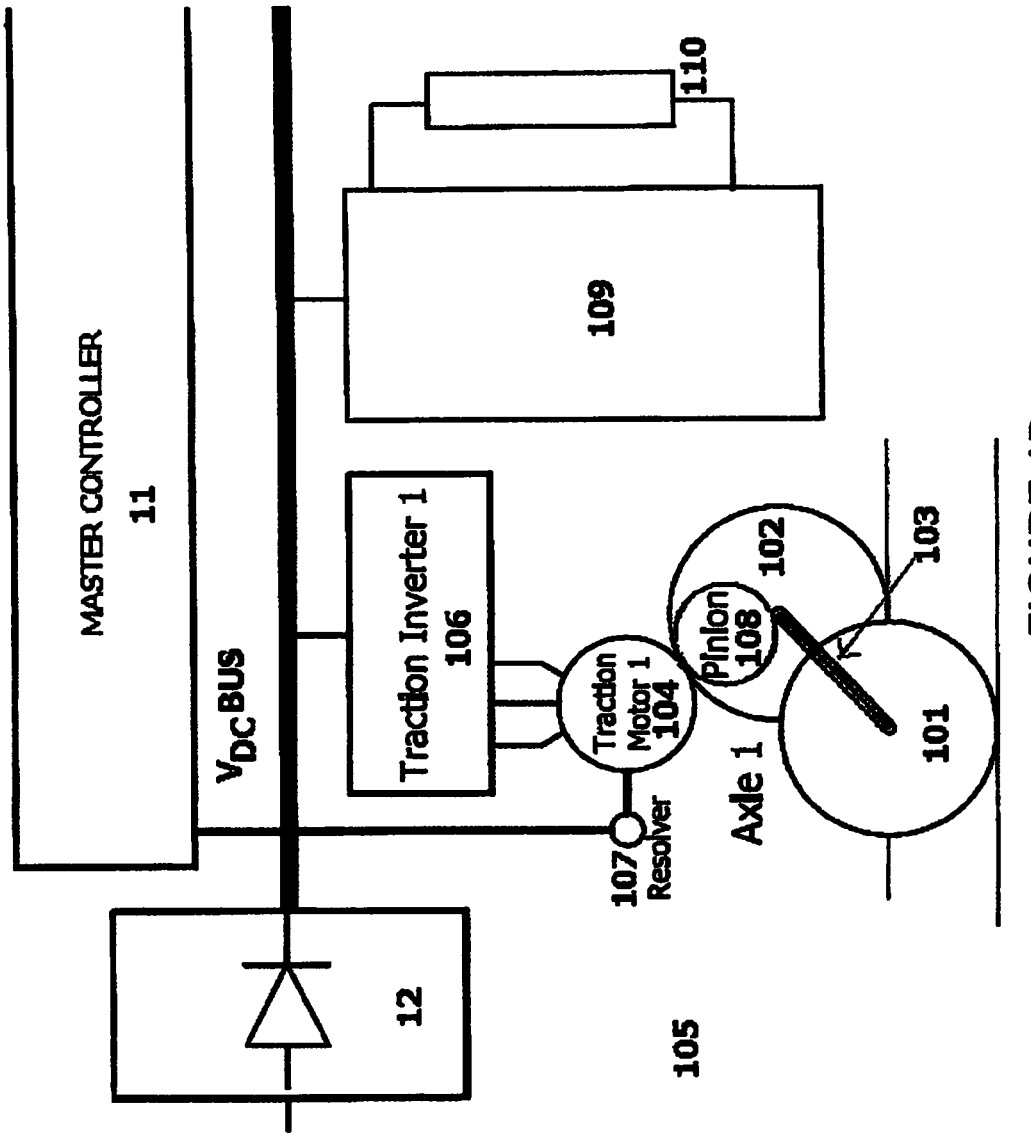
FIG. 1d is a simplified block diagram showing a more detailed view of an individual axle assembly according to either the FIG. 1a or FIG. 1b embodiment.

An alternative locomotive propulsion system in shown in FIG. 1C. The alternative propulsion system includes a power source 14A that provides power to a converter 16 from an overhead catenary supply current Iin, power source 14A applicable to an electric locomotive or EMU. Again, a speed reference input from a conventional Vehicle Control System controlled by the driver is processed to generate a drive control signal for powering a plurality of traction inverters 106. The traction inverters 106 are conventional three-phase Alternating Current (AC) Pulse Width Modulated (PWM) inverters having a plurality of pairs of Insulated Gate Bipolar Transistors (IGBT transistors) connected in such manner that, by controlling the time at which each transistor is gated into conductivity, one is connecting the DC bus to the induction coil in a coupled AC traction motor.

When used in this specification (including the claims), the term "comprises" or "comprising" is taken to specify the presence of stated features, integers, steps or components but does not preclude the presence or addition of one or more other features, integers, steps, components or groups thereof.

The present invention has been described by reference to certain preferred embodiments. Nevertheless, many modifications, variations and adaptions may be made to these without departing from the spirit and scope of the invention and all such modifications, variations and adaptions are intended to be within the meaning and scope of the invention described herein.

The invention claimed is:

1. A traction control system for a wheeled vehicle comprising a plurality of wheel sets that each comprise a plurality of wheels, the system comprising:
   a receiver that receives a speed reference signal for the vehicle;
   a determination module that determines a variance in wheel size between the wheels of a reference wheel set and the wheels of a target wheel set, based on angular velocity measurements taken for the respective wheel sets; and
   a control module that utilizes the speed reference signal and determined wheel size variance to generate a pulse width modulated drive control signal for each of the respective wheel sets, the control module modulating the respective control signals to balance tractive forces exerted by the wheels on a corresponding surface during traction and/or braking.

2. A traction control system in accordance with claim 1, further comprising a communication module for transmitting each drive control signal to an individual drive motors coupled to each of the wheel sets, the individual drive motors operable to apply a rotational force to the respective wheel sets in accordance with the received drive control signal.

3. A traction control system in accordance with claim 2, wherein the rotational force applied to each of the wheel sets is different if the variance in wheel size is above a set threshold.

4. A traction control system in accordance with claim 1, further comprising an angular velocity measurement module that determines the angular velocity of each wheel set relative to the reference wheel set, the relative angular velocity being processed to determine the wheel size variance.

5. A traction control system in accordance with claim 4, wherein the relative angular velocity is determined by comparing actual angular velocities of each of the wheels sets against the angular velocity of the reference wheel set.

6. A traction control system in accordance with claim 5, wherein the actual angular velocity measurements are taken when the vehicle is travelling at a substantially constant speed.

7. A traction control system in accordance with claim 4, wherein the vehicle is a locomotive and wherein a resolver measures the actual angular velocities of each axle coupled to the respective wheel sets.

8. A traction control system in accordance with claim 1, wherein the reference wheel set is used for determining a wheel size variance for each wheel set of the vehicle.

9. A traction control system in accordance with claim 8, wherein the axle of the reference wheel set is the trailing axle of the vehicle.

10. A traction control system in accordance with claim 1, further comprising a driver control module operable to generate the speed reference signal based on a user throttle input.

11. A traction control system in accordance with claim 2, wherein the individual motors are powered by one or more AC traction inverter circuits.

12. A traction control system in accordance with claim 1, further comprising a track condition determination module operable to determine a track condition, the track condition also being utilized to generate the pulse width modulated drive control signal.

13. A method for providing traction control on a wheeled vehicle comprising a plurality of wheel sets that each comprise a plurality of wheels, the method comprising the steps of:
   receiving a speed reference signal for the vehicle;
   determining a variance in wheel size between the wheels of a reference wheel set and the wheels of a target wheel set of the vehicle based on angular velocity measurements taken for the respective wheel sets;
   generating a pulse width modulated drive control signal for the target wheel set that balances the tractive forces exerted by the respective wheel sets on a corresponding surface during traction and/or braking, the drive control signal being generated from the speed reference signal and determined variance in wheel size.

14. A method in accordance with claim 13, further comprising transmitting each drive control signal to an individual drive motor coupled to a corresponding wheel set, the individual drive motors operable to apply a rotational force to the respective wheel set in accordance with the received drive control signal.

15. A method in accordance with claim 14, wherein the rotational force applied to each wheel set is different if the variance in wheel size is above a set threshold.

16. A method in accordance with claim 13, comprising calculating a differential angularly velocity for a target wheel set relative to the reference wheel set and determining the variance in wheel size from the relative angular velocity.

17. A method in accordance with claim 1, comprising calculating a differential angular velocity for each wheel set of the vehicle relative to the angular velocity of the reference wheel set.

18. A method in accordance with claim 17, wherein the angular velocity measurements for each wheel set are taken when the vehicle is travelling at a substantially constant speed.

19. A method in accordance with claim 16, wherein the vehicle is a locomotive and wherein a resolver measures the actual angular velocities of each axle coupled to the first and at least one other wheel set.

20. A method in accordance with claim 19, wherein the reference wheel set is the trailing wheel set of the locomotive.

21. A method in accordance with claim 13, further comprising determining a track condition, the track condition also being utilized to generate the drive control signal.

22. A traction control method comprising:
   obtaining a speed reference for a wheeled vehicle,
   measuring the angular velocity of a plurality of vehicle wheels, including a designated reference wheel, while the vehicle is travelling at a substantially constant speed,
   determining a wheel size reference for each of the plurality of wheels from the measured angular velocity of the respective wheels, the wheel size reference for an individual wheel representing the size difference between the wheel and the designated reference wheel, and
   modulating a drive control signal for each of the plurality of wheels to balance the tractive force exerted by the respective wheels, each drive control signal being generated from the vehicle speed reference and the wheel size reference for a corresponding wheel.

23. The method of claim 22 comprising determining a differential angular velocity for each of the plurality of wheels, the differential angular velocity for an individual wheel representing the angular velocity of the wheel relative to the reference wheel.

24. The method of claim 22 comprising modulating the width of pulses generated in a PWM drive control signal for a wheel to alter the tractive force exerted by the wheel.

25. The method of claim 22 comprising comparing the wheel size reference for each of the plurality of wheels to a threshold wheel size variance and moderating the drive control signal for wheels with a wheel size reference that exceed the threshold wheel size variance.

* * * * *

UNITED STATES PATENT AND TRADEMARK OFFICE
CERTIFICATE OF CORRECTION

PATENT NO. : 8,645,011 B2  Page 1 of 1
APPLICATION NO. : 12/867752
DATED : February 4, 2014
INVENTOR(S) : Bernard Schaffler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 341 days.

Signed and Sealed this

Twenty-ninth Day of September, 2015

Michelle K. Lee
*Director of the United States Patent and Trademark Office*